US009555563B2

(12) United States Patent
Oneda (10) Patent No.: US 9,555,563 B2
(45) Date of Patent: Jan. 31, 2017

(54) COMPRESSION MOLDING MACHINE AND METHOD OF PRODUCING MOLDED PRODUCT

(71) Applicant: KIKUSUI SEISAKUSHO LTD., Kyoto-shi (JP)

(72) Inventor: Yoshitsugu Oneda, Kyoto (JP)

(73) Assignee: KIKUSUI SEISAKUSHO LTD., Kyoto-Shi, Kyoto (JP)

( * ) Notice: Subject to any disclaimer, the term of this patent is extended or adjusted under 35 U.S.C. 154(b) by 16 days.

(21) Appl. No.: 14/595,963

(22) Filed: Jan. 13, 2015

(65) Prior Publication Data

US 2015/0217489 A1 Aug. 6, 2015

(30) Foreign Application Priority Data

Feb. 4, 2014 (JP) .................................. 2014-019811
Jun. 19, 2014 (JP) .................................. 2014-126009

(51) Int. Cl.
*B30B 15/00* (2006.01)
*B30B 11/08* (2006.01)
*B29C 43/18* (2006.01)
*B29L 31/00* (2006.01)

(52) U.S. Cl.
CPC ............. *B29C 43/183* (2013.01); *B30B 11/08* (2013.01); *B30B 11/085* (2013.01); *B30B 15/0011* (2013.01); *B30B 15/0088* (2013.01); *B29L 2031/772* (2013.01)

(58) Field of Classification Search
None
See application file for complete search history.

(56) References Cited

U.S. PATENT DOCUMENTS

| 3,619,462 A | * | 11/1971 | Dines ................... B30B 15/0011 264/120 |
| 2001/0001512 A1 | * | 5/2001 | Voss ....................... B05B 7/066 264/112 |
| 2004/0096495 A1 | * | 5/2004 | Watanabe ................. B01J 2/00 424/465 |
| 2008/0258343 A1 | * | 10/2008 | Tado ....................... B30B 11/08 264/338 |

FOREIGN PATENT DOCUMENTS

| CA | 2 822 557 A1 | 2/2014 |
| JP | 2012-35289 | 2/2012 |
| JP | 2012-035289 A | 2/2012 |

* cited by examiner

*Primary Examiner* — Mary F Theisen
(74) *Attorney, Agent, or Firm* — McGinn IP Law Group, PLLC.

(57) ABSTRACT

A compression molding machine includes a first spray device configured to spray an external lubricant to at least one of the inner surface of a die bore, the upper end surface of a lower punch, and the lower end surface of an upper punch, and a second spray device configured to spray a coating agent for blocking a strange taste or an odor of a molded product, or the like, to at least one of the inner surface of the die bore, the upper end surface of the lower punch, and the lower end surface of the upper punch.

6 Claims, 8 Drawing Sheets

COMPRESSION MOLDING MACHINE AND METHOD OF PRODUCING MOLDED PRODUCT

BACKGROUND

A known rotary compression molding machine includes a rotating die table provided with die bores, as well as upper punches and lower punches that are retained respectively above and below the die bores so as to be vertically slidable. The die table and the punches are co-rotated horizontally, and the upper punches and the lower punches compression mold a powdery material filled in the die bores when passing between upper and lower rolls.

In ordinary production of a product obtained by coating a molded product (uncoated tablet), the compression molding machine initially compression molds the powdery material to mold a molded product, which is then fed to an apparatus different from the compression molding machine, such as a spray coater or a pan coater, so as to be coated.

This method requires a plurality of apparatuses to be installed at a production site. This method also requires the step of feeding the molded product discharged from the compression molding machine to the spray coater or the like.

Devised in view of these was an integral compression molding machine that can compression mold and coat a molded product at one time, like the one disclosed in JP 2012-035289 A.

Production of pharmaceutical products preferably includes coating (masking) for blocking a strange taste (e.g. a bitter taste) or an odor of a tablet (molded product), coating for containing a biologically active substance (e.g. a steroid or an anticancer drug) included in a tablet, coating for protecting a medicine included in a tablet from high temperature, high humidity, or light, or coating for printing on a tablet. Provision of such coating causes problems of the labor, work, and cost.

For masking a bitter taste, particles obtained by spraying a bitter taste masking reagent to a powdery material are compression molded for production of a tablet having a less bitter taste. This method includes coating (masking) the powdery material itself, and thus requires increased labor and work.

Typically, an uncoated tablet is fragile and colorant (ink) applied directly onto an uncoated tablet spreads. Uncoated tablets are thus pretreated by means of sugar coating, film coating, or the like. Conducting such pretreatment causes the problems of the labor, work, and cost.

A tablet is occasionally colored for higher discriminability. Production of such a colored tablet requires compression molding a powdery material mixed with a pigment or the like, or film coating or sugar coating the tablet with a film agent or a sugar coating agent mixed with a pigment or the like, for example.

Provision of film coating or sugar coating causes problems of the labor, work, and cost. Furthermore, provision of film coating or sugar coating affects disintegration of a tablet. The method including such provision of film coating or sugar coating is not applicable to an orally disintegrating tablet.

A tablet preferably includes a less amount of a pigment or the like, which is an unnecessary additive. A tablet produced by compression molding a powdery material mixed with a pigment or the like problematically includes such an unnecessary additive also inside the tablet.

SUMMARY OF THE INVENTION

The invention has been devised in view of the problems mentioned above, and an object of The invention is to easily produce a molded product provided with coating for blocking a strange taste or an odor of the molded product, coating for containing a biologically active substance in the molded product, coating for protecting a medicine included in the molded product from high temperature, high humidity, or light, coating for coloring the surface of the molded product, or coating for printing.

The invention provides a compression molding machine including: a die table having a die bore penetrating vertically; a lower punch located below the die bore and having an upper end slidably inserted to the die bore; an upper punch located above the die bore to face the lower punch and having a lower end slidably inserted to the die bore; a first spray device configured to spray an external lubricant to at least one of an inner surface of the die bore, an upper end surface of the lower punch, and a lower end surface of the upper punch; a second spray device configured to spray, to at least one of the inner surface of the die bore, the upper end surface of the lower punch, and the lower end surface of the upper punch, a coating agent for blocking a strange taste or an odor of a molded product, a coating agent for containing a biologically active substance in the molded product, a coating agent for protecting a medicine included in the molded product from high temperature, high humidity, or light, a coating agent for coloring a surface of the molded product, or a coating agent for printing on the molded product; and a filling device configured to fill the die bore with a powdery material to be compression molded by the upper punch and the lower punch. Such a compression molding machine can easily produce a coated molded product.

The first spray device preferably sprays before the second spray device sprays. This configuration achieves easier unloading of the molded product.

The invention also provides a compression molding machine including: a die table having a die bore penetrating vertically; a lower punch located below the die bore and having an upper end slidably inserted to the die bore; an upper punch located above the die bore to face the lower punch and having a lower end slidably inserted to the die bore; a third spray device configured to spray, to at least one of an inner surface of the die bore, an upper end surface of the lower punch, and a lower end surface of the upper punch, a coating agent for blocking a strange taste or an odor of a molded product, a coating agent for containing a biologically active substance in the molded product, a coating agent for protecting a medicine included in the molded product from high temperature, high humidity, or light, a coating agent for coloring a surface of the molded product, or a coating agent for printing on the molded product, together with an external lubricant; and a filling device configured to fill the die bore with a powdery material to be compression molded by the upper punch and the lower punch. Such a compression molding machine can easily produce a coated molded product without including a plurality of spray devices.

The invention further provides a method of producing a molded product using a compression molding machine including a die table having a die bore penetrating vertically, a lower punch having an upper end slidably inserted to the die bore, and an upper punch having a lower end slidably inserted to the die bore, the method including: spraying an external lubricant to at least one of an inner surface of the die bore, an upper end surface of the lower punch, and a lower end surface of the upper punch; spraying, to at least one of the inner surface of the die bore, the upper end surface of the lower punch, and the lower end surface of the upper punch, a coating agent for blocking a strange taste or an odor of the molded product, a coating agent for containing a biologically active substance in the molded product, a coating agent for protecting a medicine included in the molded product from high temperature, high humidity, or light, a coating agent for coloring a surface of the molded product, or a coating agent for printing on the molded product; and filling the die bore with a powdery material to be compression molded by the upper punch and the lower punch. Such a compression molding machine can easily produce a coated molded product.

The external lubricant is preferably sprayed before the coating agent is sprayed. This configuration achieves easier unloading of the molded product.

The invention also provides a method of producing a molded product using a compression molding machine including a die table having a die bore penetrating vertically, a lower punch having an upper end slidably inserted to the die bore, and an upper punch having a lower end slidably inserted to the die bore, the method including: spraying, to at least one of an inner surface of the die bore, an upper end surface of the lower punch, and a lower end surface of the upper punch, a coating agent for blocking a strange taste or an odor of the molded product, a coating agent for containing a biologically active substance in the molded product, a coating agent for protecting a medicine included in the molded product from high temperature, high humidity, or light, a coating agent for coloring a surface of the molded product, or a coating agent for printing on the molded product, together with an external lubricant; and filling the die bore with a powdery material to be compression molded by the upper punch and the lower punch. Spraying the coating agent together with the external lubricant in this manner leads to the single spraying step.

The external lubricant can be sprayed either before or after the coating agent is sprayed, while the external lubricant is preferably sprayed before for easier unloading of the molded product.

Spraying the coating agent together with the external lubricant also achieves easier unloading of the molded product.

To the contrary, the coating agent can be sprayed before the external lubricant is sprayed for delayed disintegration of the molded product. The coating agent applied in this case can be sprayed together with the external lubricant.

When the molded product is an orally disintegrating tablet (OD tablet) and is coated for printing, the molded product sprayed with the mixture of the coating agent and the external lubricant has excellent disintegration.

When the coating agent is likely to disintegrate and be thus clogged in the spray device, the coating agent mixed with the external lubricant can be prevented from being clogged.

The coating agent for blocking a strange taste or an odor of the molded product is preferably water-insoluble and made of a material that delays leak of the medicine included in the molded product in the mouth of a recipient. Examples of such a coating agent include a polymer soluble in stomach, a water-insoluble cellulose ether, and a water-insoluble acrylic polymer.

The coating agent for containing a biologically active substance in the molded product suppresses the biologically active substance from being exposed from the molded product.

The coating agent for protecting a medicine in the molded product from high temperature, high humidity, or light prevents deterioration of the medicine. Examples of such a coating agent include titanium oxide and a lake pigment. Titanium oxide is likely to agglomerate, and is thus preferably mixed with an external lubricant when sprayed.

The coating agent for coloring the surface of the molded product can increase discriminability of the molded product. Examples of such a coating agent include powdery materials of an anthocyanin-based pigment, a carotenoid-based pigment, a quinone-based pigment, a flavonoid-based pigment, a betanin-based pigment, a monascus pigment, and any other pigment originated from a natural substance (a natural edible pigment). The examples also include a tar-based pigment, a natural pigment derivative, and a natural synthetic pigment (a synthetic edible pigment).

The coating agent for printing on the molded product suppresses colorant for printing from spreading. Examples of such a coating agent include a water-soluble cellulose derivative and a water-soluble resin.

The coating agent for coloring the surface of the molded product can be combined with the coating agent for blocking a strange taste or an odor of the molded product, the coating agent for containing a biologically active substance in the molded product, the coating agent for protecting a medicine included in the molded product from high temperature, high humidity, or light, or the coating agent for printing on the molded product.

The coating agent for printing on the molded product can be combined with the coating agent for containing a biologically active substance in the molded product, or the coating agent for protecting a medicine included in the molded product from high temperature, high humidity, or light.

The powdery material in the invention refers to an aggregate of minute solids and includes an aggregate of particles such as what is called granules and an aggregate of powder smaller than such particles.

BRIEF DESCRIPTION OF THE DRAWINGS

FIGS. 6(I) to 6(IV) are explanatory views of a method of producing a product using the compression molding machine according to the embodiment;

FIGS. 8(I) to 8(III) are explanatory views of a method of producing a product using the compression molding machine according to the embodiment.

DESCRIPTION OF THE PREFERRED EMBODIMENTS

First Embodiment

Described below are embodiments of the invention with reference to FIGS. 1 to 8. A compression molding machine according to the embodiment is of a rotary type and produces a product obtained by coating a molded product, which is obtained by compression molding a powdery material M, with a coating agent L. When the product is a pharmaceutical tablet, the powdery material M includes an active ingredient, or includes an active ingredient and an excipient.

Figure 1:
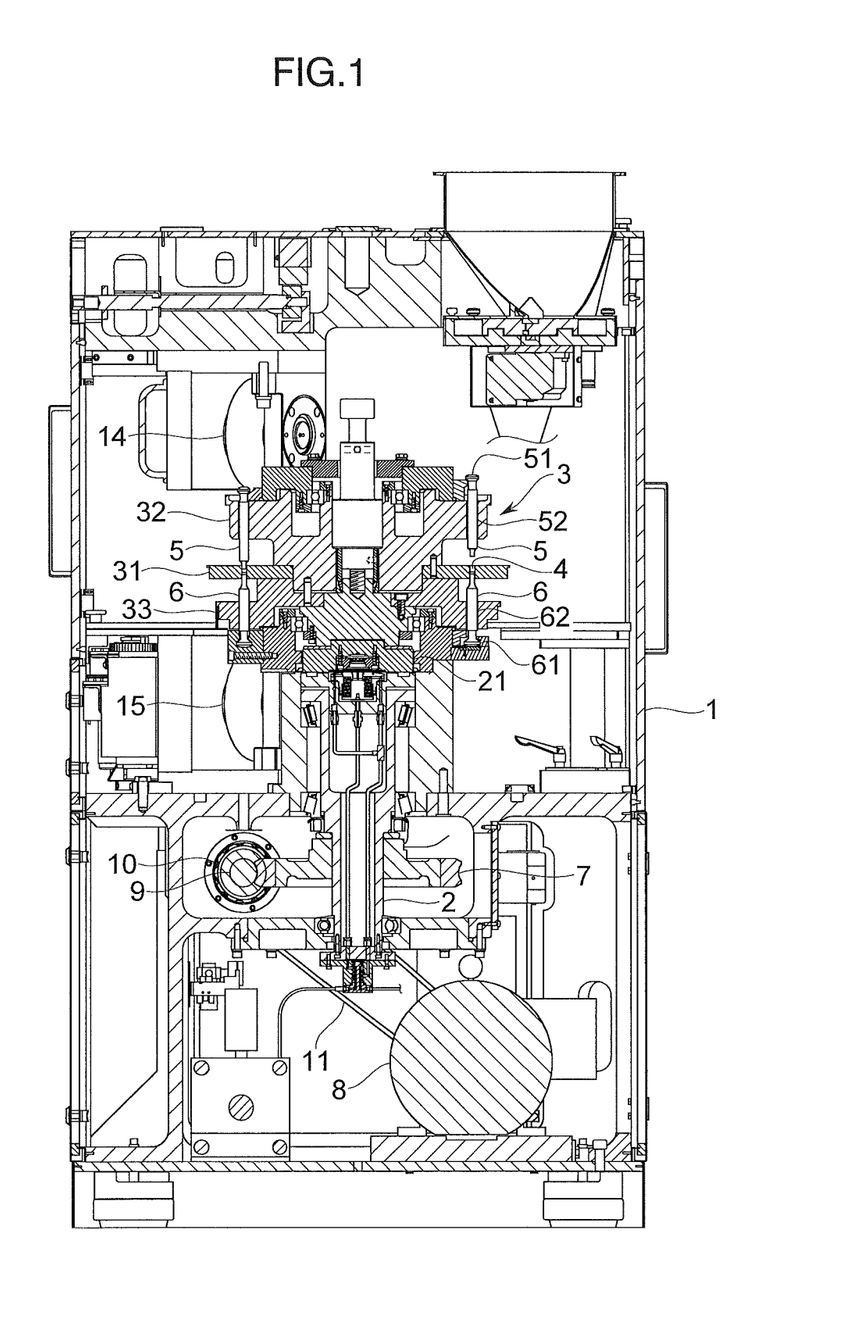
FIG. 1 is a vertical sectional view of a compression molding machine according to an embodiment of the invention.

The schematic entire configuration of the rotary compression molding machine is described initially. As shown in FIG. 1, the rotary compression molding machine includes a frame 1, an upright shaft 2 that stands in the frame 1 and functions as a rotary shaft, and a turret 3 that is attached to a connector 21 located at an upper portion of the upright shaft 2.

Figure 2:
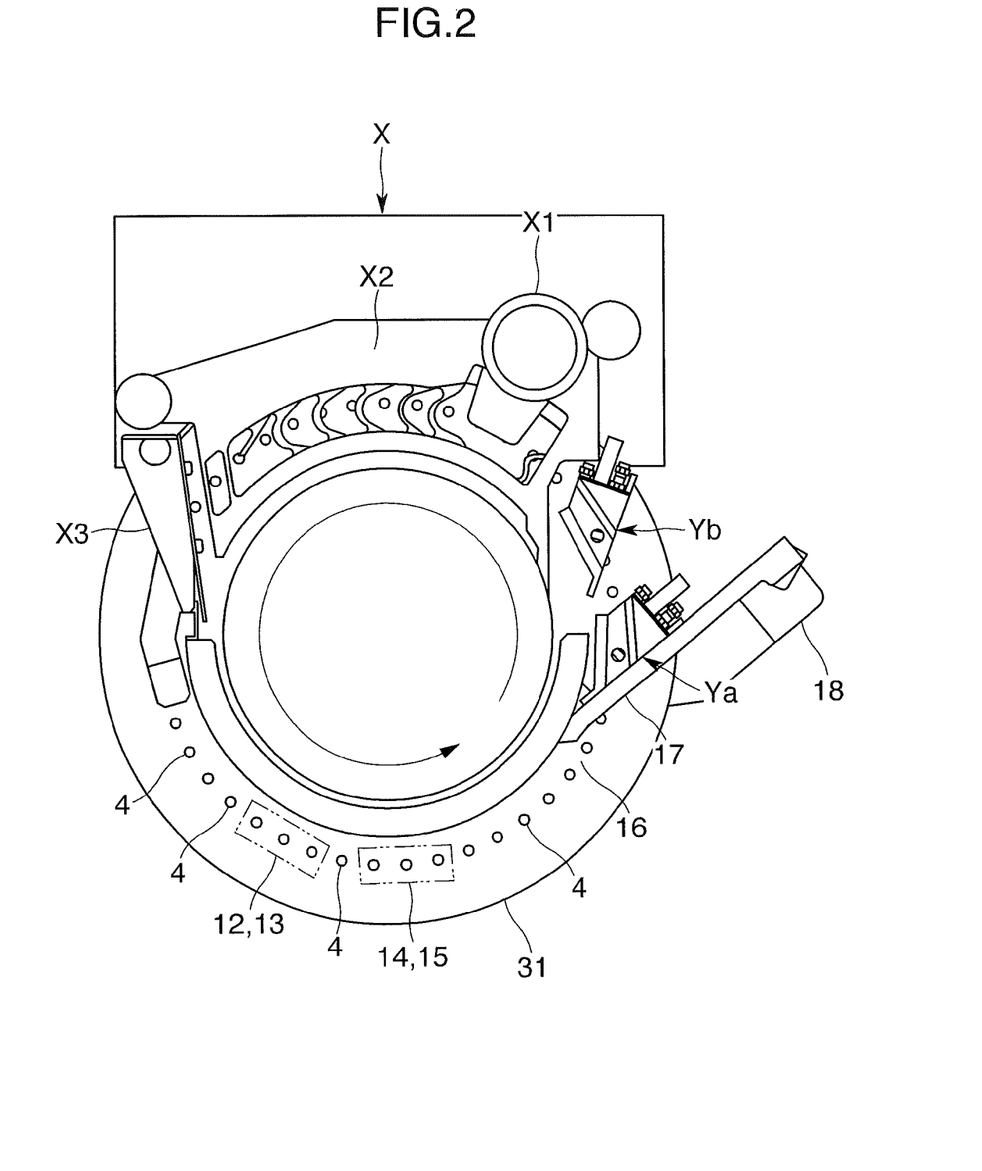
FIG. 2 is a plan view of a principal part of the compression molding machine according to the embodiment.

The turret 3 horizontally rotates about the upright shaft 2, in other words, spins. The turret 3 includes a die table (die disc) 31, an upper punch retaining portion 32, and a lower punch retaining portion 33. As shown in FIG. 2, the die table 31 has a substantially circular disc shape, and has a plurality of die bores 4 that are provided in an outer peripheral portion thereof so as to be aligned in a direction of rotation and be spaced apart from each other at predetermined intervals. The die bores 4 each vertically penetrate the die table 31. The die table 31 may be composed of a plurality of divided plates. Instead of providing the die bores 4 directly in the die table 31, a plurality of die members provided separately from the die table 31 can be detachably attached to the die table 31. In this case, the die members each have a die bore that penetrates vertically.

The upper punch 5 retaining portion 32 and the lower punch retaining portion 33 retain an upper punch 5 and a lower punch 6 above and below each of the die bores 4 so as to be individually slidable vertically in the corresponding die bore 4. The upper punches 5 each have a tip 53 that enters and exits the corresponding die bore 4. The lower punches 6 each have a tip 63 that is constantly inserted in the corresponding die bore 4. The upper punches 5 and the lower punches 6 horizontally rotate about the upright shaft 2 along with the turret 3, in other words, revolve.

The upright shaft 2 is provided, at the lower end, with a worm wheel 7. The worm wheel 7 meshes with a worm gear 10. The worm gear 10 is fixed to a gear shaft 9 that is driven by a motor 8. Drive power outputted from the motor 8 is transmitted to the gear shaft 9 by way of a belt 11, and drives to rotate the upright shaft 2 by way of the worm gear 10 and the worm wheel 7, and further to rotate the turret 3 as well as the punches 5 and 6.

Figure 3:
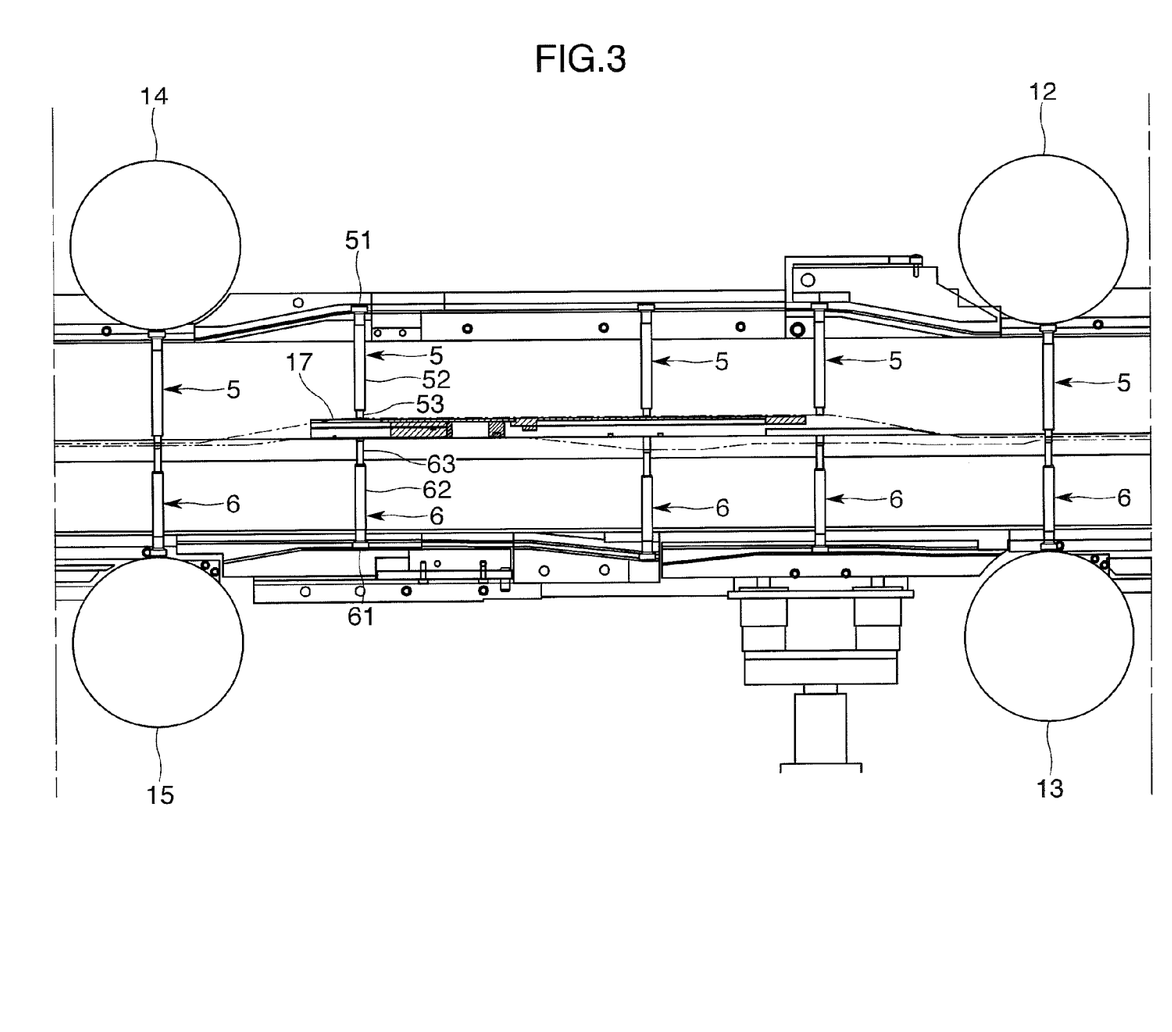
FIG. 3 is a cylindrical projection view showing the relation between punches and rolls in the compression molding machine according to the embodiment.

As shown in FIGS. 2 and 3, a pre-compression upper roll 12, a pre-compression lower roll 13, a main-compression upper roll 14, and a main-compression lower roll 15 are provided on orbits of the punches 5 and 6 that revolve about the upright shaft 2. The pre-compression upper roll 12 and the pre-compression lower roll 13 are paired to vertically sandwich the punches 5 and 6, and the main-compression upper roll 14 and the main-compression lower roll 15 are paired to vertically sandwich the punches 5 and 6. The pre-compression upper roll 12 and the pre-compression lower roll 13 as well as the main-compression upper roll 14 and the main-compression lower roll 15 bias the upper and lower punches 5 and 6 to bring the upper and lower punches 5 and 6 closer to each other, so that end surfaces of the tips 53 and 63 compress from above and below the powdery material M that is filled in the die bores 4.

The upper punches 5 and the lower punches 6 have head portions 51 and 61 that are pressed by the rolls 12, 13, 14, and 15, and shaft portions 52 and 62 that are smaller in diameter than the head portions 51 and 61, respectively. The shaft portions 52 and 62 each have a distal end of a diameter smaller than remaining portions and substantially equal to the inner diameter of the die bores 4, so as to be inserted into the die bores 4. The punches 5 and 6 revolve to bring the rolls 12, 13, 14, and 15 closer to the head portions 51 and 61 of the punches 5 and 6. The rolls 12, 13, 14, and 15 move to step onto the head portions 51 and 61 and thus come into contact therewith. The rolls 12, 13, 14, and 15 further rollover the head portions 51 and 61 and are displaced in the horizontal direction, while pressing downward the upper punches 5 and pressing upward the lower punches 6. While the rolls 12, 13, 14, and 15 are in contact with flat surfaces of the punches 5 and 6, the punches 5 and 6 keep applying constant pressure to the powdery material Min the die bores 4.

A molded product discharge portion 16 is provided ahead, in the direction of rotation of the turret 3 and the punches 5 and 6, of the position where the main-compression upper roll 14 and the main-compression lower roll 15 apply pressure. At the molded product discharge portion 16, the lower punch 6 ascends until the upper end surface of the tip 63 of the lower punch 6 reaches the height substantially same as that of the upper end of the die bore 4, in other words, the upper surface of the die table 31. The lower punch 6 pushes the molded product out of the die bore 4. The molded product discharge portion 16 is provided with a guide member 17 that guides the molded product pushed out of the die bore 4. The molded product ejected from the die bore 4 is brought into contact with the guide member 17 due to rotation of the turret 3, and moves along the guide member 17 toward a molded product collecting position 18.

A filling device X and a spray device Y (Ya, Yb, or Yc) included in the compression molding machine are described in detail below. The filling device X fills the die bores 4 with the powdery material M, and includes, as its elements, a powdery material supply mechanism X1, a feeder X2, and a leveling plate X3. The powdery material M supply mechanism X1 guides the powdery material M onto the revolution orbit of the die bores 4. The feeder X2 drops and fills the powdery material M supplied from the powdery material supply mechanism X1 into the die bore 4 as the lower punch 6 descends to a predetermined height. The leveling plate X3 levels the powdery material M that overflows the die bore 4 as the lower punch 6 ascends after the feeder X2 fills the powdery material M, and removes the overflown powdery material M from above the die bore 4.

Figure 4:
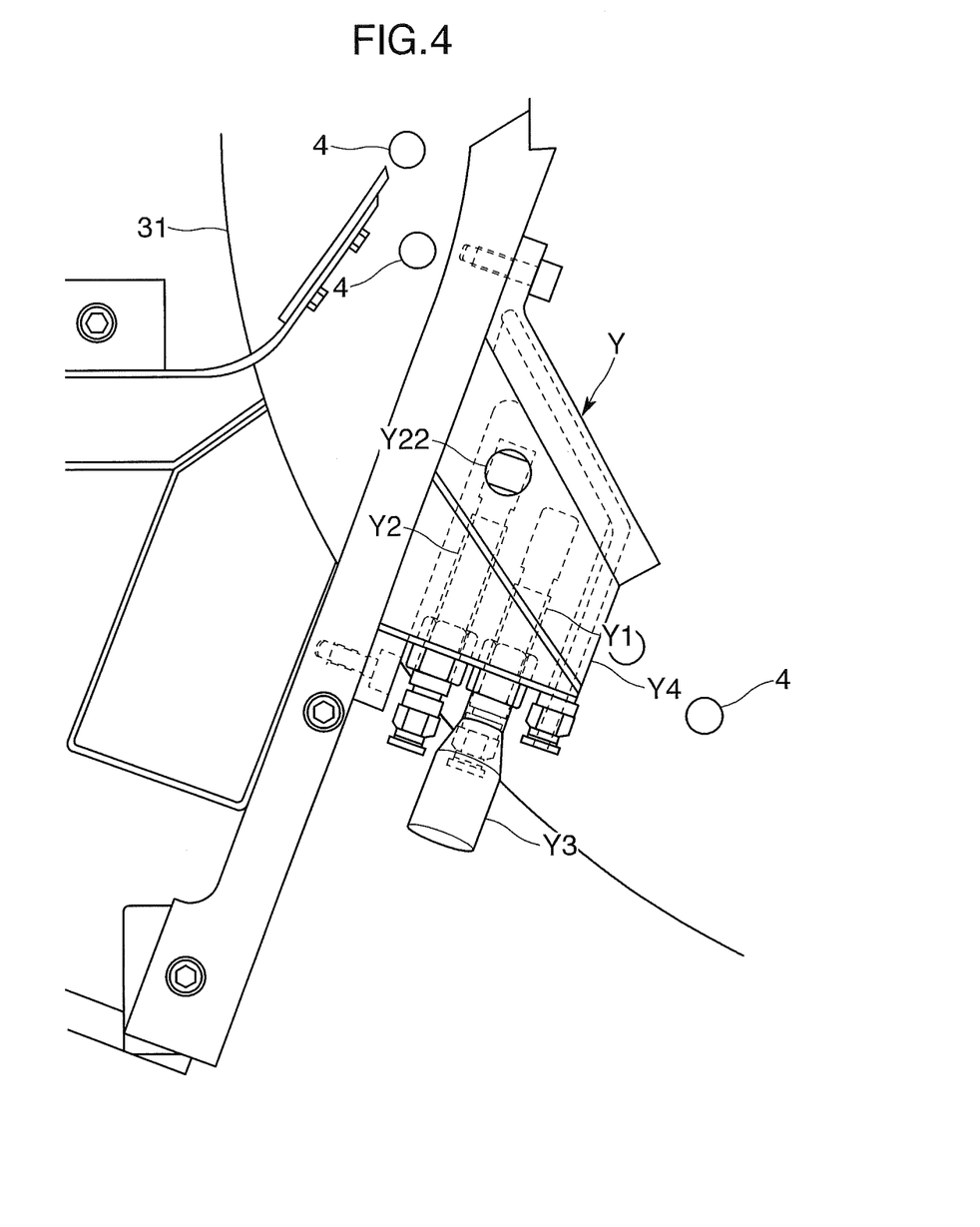
FIG. 4 is an enlarged plan view of a principal part of a spray device in the compression molding machine according to the embodiment.

The spray device Y sprays powder propellant other than the powdery material M to the inner peripheral surface of the die bore 4, the upper end surface of the tip 63 of the lower punch 6, and the lower end surface of the tip 53 of the upper punch 5. The propellant includes an external lubricant K or the coating agent L to be described later. As shown in FIG. 4, the spray device Y includes, as its elements, a downward spray nozzle Y1 configured to guide propellant supplied from an external propellant supply device (not shown) and spray the propellant toward the die bore 4 and the upper end surface of the tip 63 of the lower punch 6, an upward spray nozzle Y2 configured to guide propellant supplied from the propellant supply device and spray the propellant toward the lower end surface of the tip 53 of the upper punch 5, a purging suction duct Y3 configured to suck excessive propellant or the like not adhering to the die bore 4 or the tips 53 or 63 of the punch 5 or 6 and discharge the sucked propellant or the like (the propellant may be fed back to the propellant supply device) and a case Y4 retaining the downward spray nozzle Y1, the upward spray nozzle Y2, and the suction duct Y3.

Figure 5:
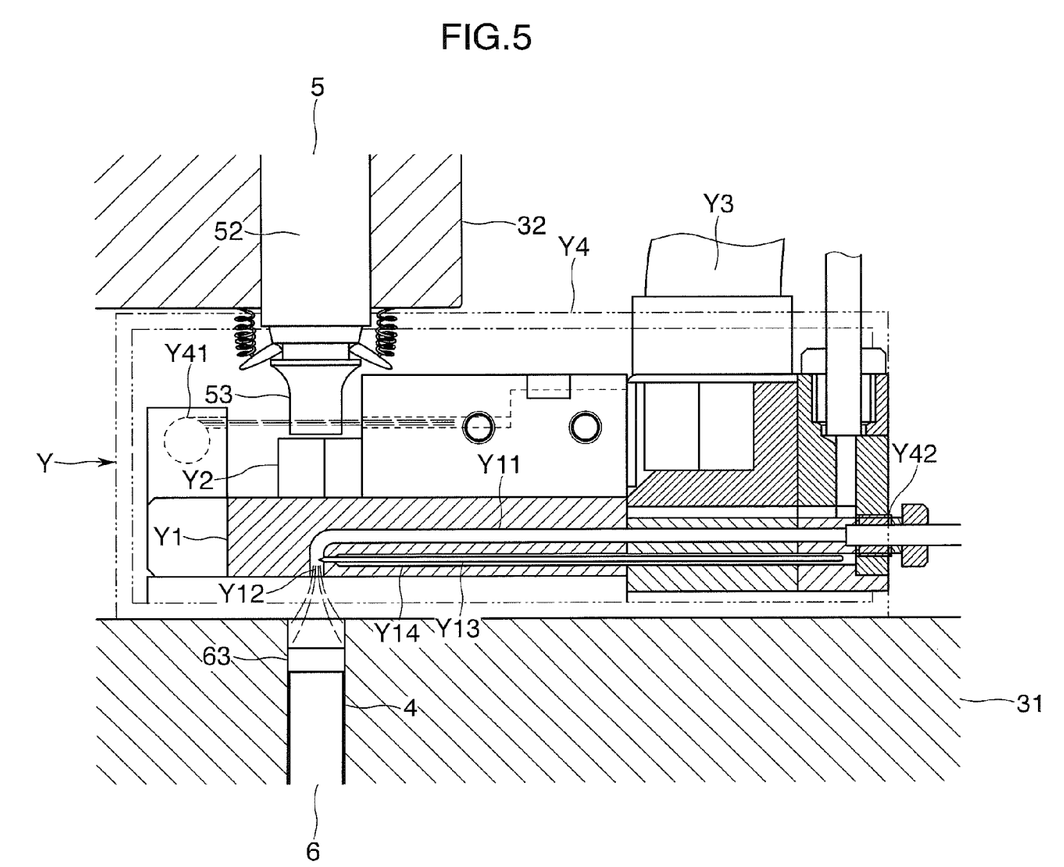
FIG. 5 is a vertical sectional view of the principal part of the spray device in the compression molding machine according to the embodiment.

As shown in FIG. 5, the downward spray nozzle Y1 has a distribution pipe Y11 bored in a block made of a fluororesin (particularly polytetrafluoroethylene) so as to extend in a substantially horizontal direction, and a spray port Y12 formed by bending downward the terminal end of the distribution pipe Y11 so as to be opened to the lower surface of the block. The distribution pipe Y11 and the spray port Y12 have inner surfaces as smooth surfaces of the fluororesin, and thus smooth distribution and spraying of propellant. The downward spray nozzle Y1 has a static electricity generating electrode Y13 buried therein. The static electricity generating electrode Y13 has a distal end in a needle or tapered shape, which protrudes in an area near the spray port Y12. The static electricity generating electrode Y13 receives high DC voltage of about −20 kV, and forcibly electrostatically charges propellant immediately before being sprayed with an electric field concentrated at the distal end thereof.

The upward spray nozzle Y2 is structured such that the downward spray nozzle Y1 shown in FIG. 5 is placed upside down. More specifically, the upward spray nozzle Y2 has a distribution pipe bored in a block made of a fluororesin so as to extend in a substantially horizontal direction, and a spray port Y22 formed by bending upward the terminal end of the distribution pipe so as to be opened to the upper surface of the block. The upward spray nozzle Y2 also has a static electricity generating electrode buried therein. The static electricity generating electrode has a distal end in a needle or tapered shape, which protrudes in an area near the spray port Y22.

The suction duct Y3 is located at a height substantially equal to that of the side portion of the tip 53 of the upper punch 5. The suction duct Y3 has an opening that is fixed to the case Y4 and communicates with the internal space of the case Y4.

The case Y4 is a box that is made of a fluororesin and mostly covers the downward spray nozzle Y1 and the upward spray nozzle Y2 so as to prevent random dispersion of propellant. The case Y4 is electrically insulated from the turret 3 and the spray nozzles Y1 and Y2. The case Y4 has an air curtain Y41 formed by blowing out compressed air substantially in a horizontal direction toward the opening of the suction duct Y3. The air curtain Y41 forms an air flow in the vicinity of the tip 53 of the upper punch 5, and prevents upward scatter of propellant that is sprayed from the upward spray nozzle Y2 toward the tip 53 of the upper punch 5.

The external propellant supply device is known in the art and includes a μR feeding unit (the product name of Nisshin Engineering Inc.) configured to eject propellant accurately and stably little by little through a filling roll of a thin-groove filling type and pneumatically feed the ejected propellant along with pressurized air.

Propellant supplied from the propellant supply device is divided and supplied to the downward spray nozzle Y1 and the upward spray nozzle Y2, flows through the distribution pipes in the nozzles Y1 and Y2, and is sprayed from the spray ports Y12 and Y22. The propellant being sprayed is forcibly electrostatically charged. The die bore 4 and the punches 5 and 6 are grounded via the ground of the turret 3. The electrostatically charged propellant strongly adheres to the inner peripheral surface of the die bore 4, the upper end surface of the tip 63 of the lower punch 6, and the lower end surface of the tip 53 of the upper punch 5, which are metal surfaces. The propellant having adhered is not separated by vibration of the punches 5 and 6 moving upward and downward or wind pressure caused by rapid rotation of the turret 3. The propellant having adhered is transferred from the die bore 4 and the tips 53 and 63 of the punches 5 and 6 to adhere to a tablet simultaneously when the punches 5 and 6 compression mold the powdery material M.

As shown in FIG. 2, there are provided a plurality of spray devices Y in The embodiment. The first spray device Ya, the second spray device Yb, the filling device X, the pre-compression rolls 12 and 13, the main-compression rolls 14 and 15, and the molded product discharge portion 16 are aligned in this order in the direction of rotation of the turret 3. The first spray device Ya sprays the external lubricant K as propellant, whereas the second spray device Yb sprays the coating agent L as propellant.

The external lubricant K sprayed from the first spray device Ya prevents binding of the powdery material M to the inner periphery of the die bore 4 and sticking of the powdery material M to the tips 53 and 63 of the punches 5 and 6 (both of which cause a scratch, rough shaping, or a crack of a product). Examples of the external lubricant K include a metal stearate (particularly magnesium stearate) and talc.

The coating agent L sprayed from the second spray device Yb coats the outer surface of a product. Examples of coating on a molded product include coating for blocking a strange taste (particularly a bitter taste) or an odor of a tablet as the molded product, coating for containing a biologically active substance (e.g. a steroid or an anticancer drug) included in the tablet, coating for protecting a medicine included in the tablet from high temperature, high humidity, or light, and coating for printing on the tablet.

The first spray device Ya and the second spray device Yb can be replaced with each other.

The coating agent (masking agent) L for blocking a strange taste or an odor of the molded product is preferably water-insoluble and made of a material that delays leak of the medicine included in the tablet in the mouth of a recipient. Examples of the coating agent L include a polymer soluble in stomach, a water-insoluble cellulose ether, and a water-insoluble acrylic polymer. Examples of the polymer soluble in stomach include a methyl methacrylate-butyl methacrylate-dimethylaminoethyl methacrylate copolymer such as aminoalkyl methacrylate copolymer E, a polyvinyl derivative soluble in stomach such as polyvinyl acetal diethyl aminoacetate. Known examples of the water-insoluble cellulose ether include ethyl cellulose and aqueous dispersion of ethyl cellulose. Examples of the water-insoluble acrylic polymer include dispersion of ethyl acrylate-methyl methacrylate copolymer.

The coating agent L for containing a biologically active substance included in the molded product suppresses the biologically active substance from being exposed from the tablet and prevents a human body in contact with the tablet from being affected inappropriately.

The coating agent L for protecting a medicine included in the molded product from high temperature, high humidity, or light prevents deterioration of the medicine. Examples of the coating agent L having such a function include titanium oxide and a lake pigment.

Titanium oxide is likely to agglomerate, and is thus preferably mixed with the external lubricant when sprayed, so as not to be clogged in the spray device Yb.

The coating agent L for coloring the surface of the molded product can increase discriminability of the molded product. Particularly, an orally disintegrating tablet cannot be provided with sugar coating or film coating that affects disintegration. The coating agent L for coloring the surface of the molded product does not affect disintegration and can thus be applied to an orally disintegrating tablet.

The coating agent L for coloring the surface of the molded product is not particularly limited and has only to be a pigment powdery material. Examples of the coating agent L for coloring the surface of the molded product include powdery materials of an anthocyanin-based pigment, a carotenoid-based pigment, a quinone-based pigment, a flavonoid-based pigment, a betanin-based pigment, a monascus pigment, and any other pigment originated from a natural substance (a natural edible pigment). The examples also include powdery materials of a tar-based pigment, a natural pigment derivative, and a natural synthetic pigment (a synthetic edible pigment).

Examples of the anthocyanin-based pigment include red radish pigment, red cabbage pigment, red kerneled rice pigment, elder berry pigment, cowberry pigment, gooseberry pigment, cranberry pigment, salmonberry pigment, perilla pigment, strawberry pigment, dark sweet cherry pigment, cherry pigment, hibiscus pigment, huckleberry pigment, grape juice pigment, grape skin pigment, blackcurrant pigment, blackberry pigment, blueberry pigment, plum pigment, whortleberry pigment, boysenberry pigment, mulberry pigment, purple sweet potato pigment, purple corn pigment, purple yam pigment, raspberry pigment, redcurrant pigment, loganberry pigment, and other anthocyanin-based pigments.

Examples of the carotenoid-based pigment include annatto pigment, gardenia yellow pigment, and other carotenoid-based pigments.

Examples of the quinone-based pigment include cochineal pigment, lithospermum root pigment, lac pigment, and other quinone-based pigments.

Examples of the flavonoid-based pigment include safflower yellow pigment, kaoliang pigment, onion pigment, and other flavonoid-based pigments.

Examples of the betanin-based pigment include beet red pigment.

Examples of the monascus pigment include monascus pigment and monascus yellow pigment.

Examples of the other pigment originated from a natural substance include turmeric pigment, stinkwood pigment, gardenia red pigment, gardenia blue pigment, and spirulina pigment.

Examples of the tar-based pigment include food red No. 2, food red No. 3, food red No. 40, food red No. 102, food red No. 104, food red No. 105, food red No. 106, food yellow No. 4, food yellow No. 5, food blue No. 1, food blue No. 2, food red No. 2 aluminum lake, food red No. 3 aluminum lake, food red No. 40 aluminum lake, food yellow No. 4 aluminum lake, food yellow No. 5 aluminum lake, food blue No. 1 aluminum lake, and food blue No. 2 aluminum lake.

Examples of the natural pigment derivative include copper chlorophyll, sodium copper chlorophyllin, and potassium norbixin.

Examples of the natural synthetic pigment include β-carotene and riboflavin.

The coating agent L for printing (e.g. indicating a name, an identification code, a mark, or the like on a tablet for prevention of erroneous ingestion) on the molded product suppresses spread of colorant (ink) used for printing. Examples of the coating agent L having such a function include a water-soluble cellulose derivative and a water-soluble resin.

Two or more kinds of coating agents L can be used in combination as necessary.

The rotary compression molding machine according to The embodiment performs the following steps for producing a product. As shown in FIG. 6(I), the first spray device Ya initially sprays and applies the external lubricant K to the inner peripheral surface of the die bore 4, the upper end surface of the tip 63 of the lower punch 6, and the lower end surface of the tip 53 of the upper punch 5.

Figure 6:
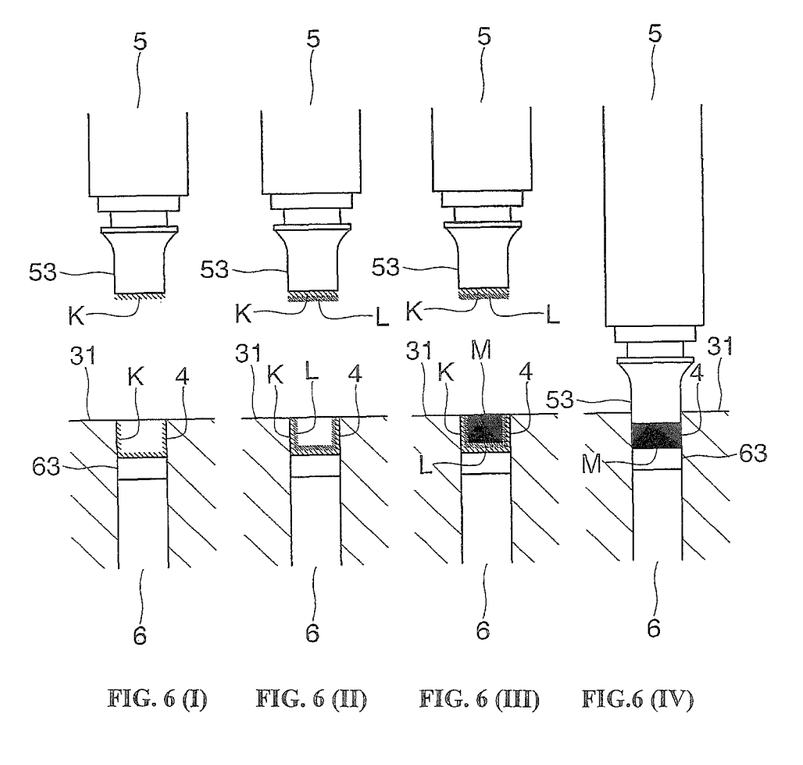

As shown in FIG. 6(II), the second spray device Yb subsequently sprays and applies the coating agent L onto the external lubricant K on the inner peripheral surface of the die bore 4, the upper end surface of the tip 63 of the lower punch 6, and the lower end surface of the tip 53 of the upper punch 5.

As shown in FIG. 6(III), the filling device X then fills the die bore 4 with the powdery material M. As shown in FIG. 6(IV), the upper punch 5 and the lower punch 6 are then pressed by the pre-compression rolls 12 and 13 to preliminarily compress the powdery material M in the die bore 4, and are further pressed by the main-compression rolls 14 and 15 to mainly compress the powdery material M in the die bore 4. Accordingly completed is a product obtained by coating the outer surface of a molded product, which is obtained by compression molding the powdery material M, with the coating agent L.

The embodiment provides a compression molding machine including: a die table 31 having a die bore 4 penetrating vertically; a lower punch 6 located below the die bore 4 and having an upper end slidably inserted to the die bore 4; an upper punch 5 located above the die bore 4 to face the lower punch 6 and having a lower end slidably inserted to the die bore 4; a first spray device Ya configured to spray an external lubricant K to at least one of an inner surface of the die bore 4, an upper end surface of the lower punch 6, and a lower end surface of the upper punch 5; a second spray device Yb configured to spray, to at least one of the inner surface of the die bore 4, the upper end surface of the lower punch 6, and the lower end surface of the upper punch 5, a coating agent L for blocking a strange taste or an odor of a molded product, a coating agent L for containing a biologically active substance in the molded product, a coating agent L for protecting a medicine included in the molded product from high temperature, high humidity, or light, a coating agent L for coloring a surface of the molded product, or a coating agent L for printing on the molded product; and a filling device X configured to fill, after the second spray device Yb completes spraying, the die bore 4 with a powdery material M to be compression molded by the upper punch 5 and the lower punch 6.

A method of producing a molded product according to The embodiment includes: spraying an external lubricant K to at least one of an inner surface of the die bore 4, an upper end surface of the lower punch 6, and a lower end surface of the upper punch 5; spraying, to at least one of the inner surface of the die bore 4, the upper end surface of the lower punch 6, and the lower end surface of the upper punch 5, a coating agent L for blocking a strange taste or an odor of the molded product, a coating agent L for containing a biologically active substance in the molded product, a coating agent L for protecting a medicine included in the molded product from high temperature, high humidity, or light, a coating agent L for coloring a surface of the molded product, or a coating agent L for printing on the molded product; and filling, after the spraying the coating agent L, the die bore 4 with a powdery material M to be compression molded by the upper punch 5 and the lower punch 6.

The embodiment enables production of a product obtained by coating a molded product, which is obtained by compression molding the powdery material M, with the coating agent L, using the single compression molding machine, and thus reduces the labor and work for the production.

Particularly when coating a molded product with the coating agent L for containing a biologically active substance in the molded product, the biologically active substance can be contained in (a housing 1 of) the compression molding machine of excellent containment performance. More specifically, production does not include the conveying step of discharging a compression molded product from the compression molding machine and feeding the molded product to a spray coater or the like as in the case of using the compression molding machine with the spray coater, a pan coater, or the like. This reduces the opportunity to expose an operator to the biologically active substance.

Second Embodiment

A compression molding machine according to the second embodiment preliminarily mixes the external lubricant K and the coating agent L and then simultaneously sprays the mixture from the single spray device Yc toward the die bore 4 and the punches 5 and 6. Mainly described below are the differences from the first embodiment. The configurations in common with those according to the first embodiment will not be described repeatedly.

Figure 7:
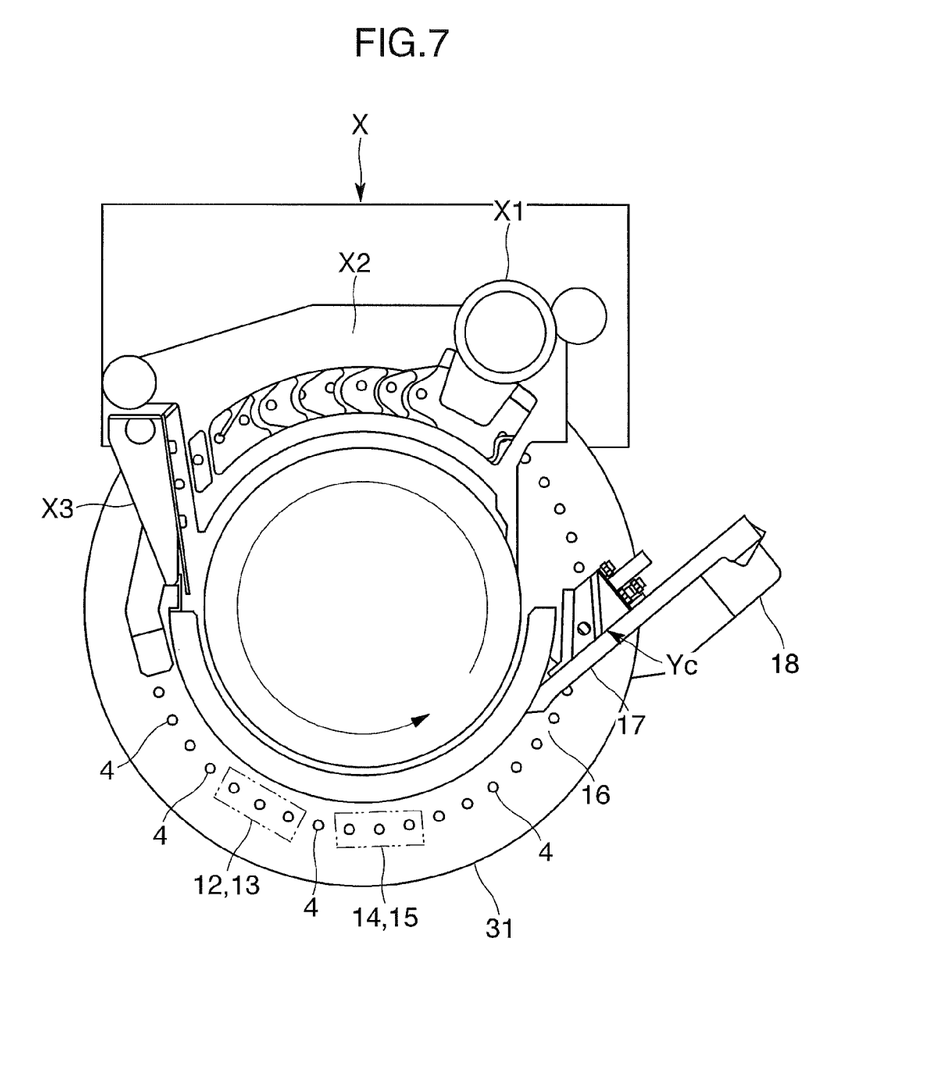
FIG. 7 is a plan view of a principal part in a compression molding machine according to an embodiment of the invention.

As shown in FIG. 7, according to The embodiment, the third spray device Yc, the filling device X, the pre-compression rolls 12 and 13, the main-compression rolls 14 and 15, and the molded product discharge portion 16 are aligned in this order in the direction of rotation of the turret 3.

The third spray device Yc sprays, as propellant, the mixture of the external lubricant K and the coating agent L toward the die bore 4, the upper end surface of the tip 63 of the lower punch 6, and the lower end surface of the tip 53 of the upper punch 5.

The rotary compression molding machine according to The embodiment performs the following steps for producing a product. As shown in FIG. 8(I), the third spray device Yc initially sprays and applies the mixture of the external lubricant K and the coating agent L to the inner peripheral surface of the die bore 4, the upper end surface of the tip 63 of the lower punch 6, and the lower end surface of the tip 53 of the upper punch 5.

Figure 8:
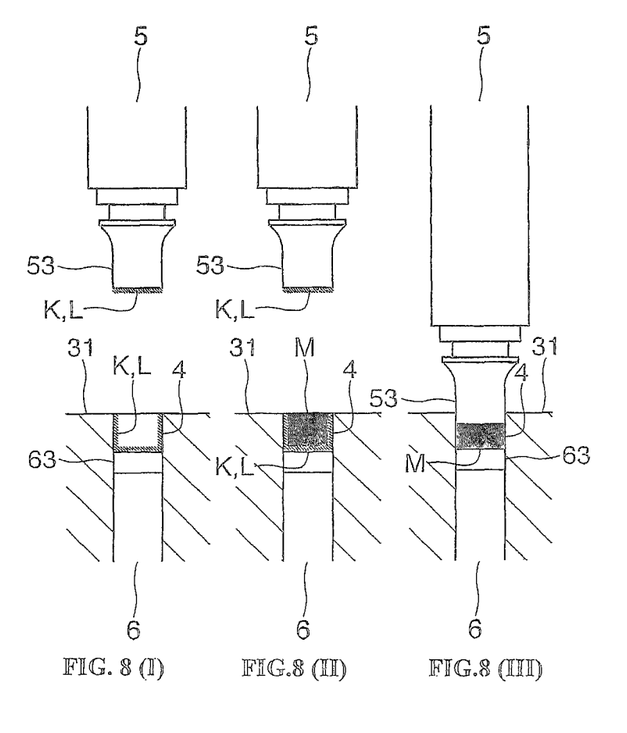

As shown in FIG. 8(II), the filling device X subsequently fills the die bore 4 with the powdery material M. As shown in FIG. 8(III), the upper punch 5 and the lower punch 6 are then pressed by the pre-compression rolls 12 and 13 to preliminarily compress the powdery material M in the die bore 4, and are further pressed by the main-compression rolls 14 and 15 to mainly compress the powdery material M in the die bore 4. Accordingly completed is a product obtained by coating the outer surface of a molded product, which is obtained by compressing the powdery material M, with the coating agent L.

The embodiment provides a compression molding machine including: a die table 31 having a die bore 4 penetrating vertically; a lower punch 6 located below the die bore 4 and having an upper end slidably inserted to the die bore 4; an upper punch 5 located above the die bore 4 to face the lower punch 6 and having a lower end slidably inserted to the die bore 4; a third spray device Yc configured to spray, to at least one of an inner surface of the die bore 4, an upper end surface of the lower punch 6, and a lower end surface of the upper punch 5, a coating agent L for blocking a strange taste or an odor of a molded product, a coating agent L for containing a biologically active substance in the molded product, a coating agent L for protecting a medicine included in the molded product from high temperature, high humidity, or light, a coating agent L for coloring a surface of the molded product, or a coating agent L for printing on the molded product, together with an external lubricant K; and a filling device X configured to fill, after the third spray device Yc completes spraying, the die bore 4 with a powdery material M to be compression molded by the upper punch 5 and the lower punch 6.

A method of producing a molded product according to The embodiment includes: spraying, to at least one of an inner surface of the die bore 4, an upper end surface of the lower punch 6, and a lower end surface of the upper punch 5, a coating agent L for blocking a strange taste or an odor of the molded product, a coating agent L for containing a biologically active substance in the molded product, a coating agent L for protecting a medicine included in the molded product from high temperature, high humidity, or light, a coating agent L for coloring a surface of the molded product, or a coating agent L for printing on the molded product, together with an external lubricant K; and filling, after the spraying, the die bore 4 with a powdery material M to be compression molded by the upper punch 5 and the lower punch 6.

The embodiment enables production of a product obtained by coating a molded product, which is obtained by compressing the powdery material M, with the coating agent L, using the single compression molding machine, and thus reduces the labor, work, and cost for the production.

The invention is not limited to the above embodiments described in detail. For example, the coating agent or the external lubricant can be sprayed for a plurality of times. Specific configurations of the other portions are not limited to those according to the embodiments described above, but The invention can be modified in various manners within the range not departing from the purposes of The invention.

What is claimed is:

1. A compression molding machine, comprising:
   a die table including a die bore penetrating vertically;
   a lower punch located below the die bore and including an upper end slidably inserted to the die bore;
   an upper punch located above the die bore to face the lower punch and including a lower end slidably inserted to the die bore;
   a first spray device configured to spray an external lubricant to at least one of an inner surface of the die bore, an upper end surface of the lower punch, and a lower end surface of the upper punch;
   a second spray device configured to spray, to at least one of the inner surface of the die bore, the upper end surface of the lower punch, and the lower end surface of the upper punch, a coating agent for blocking a taste or an odor of a molded product, a coating agent for containing a biologically active substance in the molded product, a coating agent for protecting a medicine included in the molded product from high temperature, high humidity, or light, a coating agent for coloring a surface of the molded product, or a coating agent for printing on the molded product; and
   a filling device configured to fill the die bore with a powdery material to be compression molded by the upper punch and the lower punch,
   wherein at least one of the first spray device and the second spray device includes:
      a downward spray nozzle configured to guide and spray a propellant toward the die bore and the upper end surface of the lower punch;

an upward spray nozzle configured to guide and spray the propellant toward the lower end surface of the upper punch; and a purging suction duct configured to suck and discharge an excessive propellant not adhering to the die bore, the lower punch, or the upper punch.

2. The compression molding machine according to claim 1, wherein the suction duct is located at a height equal to that of the side portion of a tip of the upper punch.

3. A compression molding machine, comprising:
a die table including a die bore penetrating vertically;
a lower punch located below the die bore and including an upper end slidably inserted to the die bore;
an upper punch located above the die bore to face the lower punch and including a lower end slidably inserted to the die bore;
a spray device configured to spray, to at least one of an inner surface of the die bore, an upper end surface of the lower punch, and a lower end surface of the upper punch, a coating agent for blocking a taste or an odor of a molded product, a coating agent for containing a biologically active substance in the molded product, a coating agent for protecting a medicine included in the molded product from high temperature, high humidity, or light, a coating agent for coloring a surface of the molded product, or a coating agent for printing on the molded product, together with an external lubricant; and
a filling device configured to fill the die bore with a powdery material to be compression molded by the upper punch and the lower punch,
wherein the spray device includes:
a downward spray nozzle configured to guide and spray a propellant toward the die bore and the upper end surface of the lower punch;
an upward spray nozzle configured to guide and spray the propellant toward the lower end surface of the upper punch; and
a purging suction duct configured to suck and discharge an excessive propellant not adhering to the die bore, the lower punch, or the upper punch.

4. The compression molding machine according to claim 3, wherein the suction duct is located at a height equal to that of the side portion of a tip of the upper punch.

5. A method of producing a molded product using a compression molding machine including a die table including a die bore penetrating vertically, a lower punch including an upper end slidably inserted to the die bore, and an upper punch including a lower end slidably inserted to the die bore, the method comprising:
spraying an external lubricant to at least one of an inner surface of the die bore, an upper end surface of the lower punch, and a lower end surface of the upper punch;
spraying, to at least one of the inner surface of the die bore, the upper end surface of the lower punch, and the lower end surface of the upper punch, a coating agent for blocking a taste or an odor of the molded product, a coating agent for containing a biologically active substance in the molded product, a coating agent for protecting a medicine included in the molded product from high temperature, high humidity, or light, a coating agent for coloring a surface of the molded product, or a coating agent for printing on the molded product; and
filling the die bore with a powdery material to be compression molded by the upper punch and the lower punch,
wherein the compression molding machine includes:
a downward spray nozzle configured to guide and spray a propellant toward the die bore and the upper end surface of the lower punch;
an upward spray nozzle configured to guide and spray the propellant toward the lower end surface of the upper punch; and
a purging suction duct configured to suck and discharge an excessive propellant not adhering to the die bore, the lower punch, or the upper punch.

6. The method according to claim 5, wherein the suction duct is located at a height equal to that of the side portion of a tip of the upper punch.

* * * * *